US010577260B2

(12) United States Patent
Dopslaff et al.

(10) Patent No.: US 10,577,260 B2
(45) Date of Patent: Mar. 3, 2020

(54) BLENDING CONTROL METHOD WITH DETERMINATION OF UNTREATED WATER HARDNESS VIA THE CONDUCTIVITY OF THE SOFT WATER AND BLENDED WATER

(71) Applicant: Judo Wasseraufbereitung GmbH, Winnenden (DE)

(72) Inventors: Hartmut Dopslaff, Winnenden (DE); Carsten H. Dopslaff, Winnenden (DE)

(73) Assignee: JUDO WASSERAUFEREITUNG GMBH, Winnenden (DE)

( * ) Notice: Subject to any disclaimer, the term of this patent is extended or adjusted under 35 U.S.C. 154(b) by 274 days.

(21) Appl. No.: 15/182,988

(22) Filed: Jun. 15, 2016

(65) Prior Publication Data

US 2016/0297691 A1 Oct. 13, 2016

Related U.S. Application Data

(63) Continuation of application No. PCT/EP2013/076908, filed on Dec. 17, 2013.

(51) Int. Cl.
*C02F 1/42* (2006.01)
*C02F 1/00* (2006.01)
(Continued)

(52) U.S. Cl.
CPC .......... *C02F 1/42* (2013.01); *B01F 15/00227* (2013.01); *C02F 1/008* (2013.01);
(Continued)

(58) Field of Classification Search
CPC .......... B01D 2311/246; B01F 15/00227; B01J 47/14; B01J 49/85; C02F 1/008;
(Continued)

(56) References Cited

U.S. PATENT DOCUMENTS

2009/0114598 A1 5/2009 Van Kralingen et al.
2010/0301882 A1 12/2010 Soecknick et al.
(Continued)

FOREIGN PATENT DOCUMENTS

CA 2 706 000 A1 6/2009
CA 2 731 694 A1 2/2010
(Continued)

OTHER PUBLICATIONS

MIT Blended Tank Lesson 3, Process Dynamics, Operations, and Control Course 10.450, Spring 2006 (https://ocw.mit.edu/courses/chemical-engineering/10-450-process-dynamics-operations-and-control-spring-2006/lecture-notes/3_blend_tank.pdf) (Year: 2006).*
(Continued)

*Primary Examiner* — Patrick Orme
(74) *Attorney, Agent, or Firm* — Hackler Daghighian Martino & Novak

(57) ABSTRACT

A method for operating a water softening plant includes an automatic blending device, an incoming flow of untreated water being divided into a first partial flow which is softened and a second partial flow which is not softened and then combined into a flow of blended water. The proportions of the two partial flows are adjusted by the automatic blending device such that a desired hardness DV results in the flow of blended water. The conductivity of the softened water and blended water are measured by conductivity sensors in their respective flows. The conductivity of the untreated water is calculated from the measured conductivity of the soft water, from the measured conductivity of the blended water and from the determined proportions of the partial flows. It is possible for the hardness of the blended water to be adjusted very reliably and with improved accuracy.

19 Claims, 3 Drawing Sheets

(51) Int. Cl.
*B01F 15/00* (2006.01)
*C02F 101/10* (2006.01)

(52) U.S. Cl.
CPC .... *C02F 2101/10* (2013.01); *C02F 2209/055* (2013.01); *C02F 2209/40* (2013.01); *C02F 2301/043* (2013.01); *C02F 2303/22* (2013.01)

(58) Field of Classification Search
CPC .. C02F 1/42; C02F 2101/10; C02F 2209/001; C02F 2209/005; C02F 2209/006; C02F 2209/05; C02F 2209/055; C02F 2209/40; C02F 2301/043; C02F 2303/22
See application file for complete search history.

(56) References Cited

U.S. PATENT DOCUMENTS

| | | | |
|---|---|---|---|
| 2011/0132818 A1 | 6/2011 | Dopslaff et al. | |
| 2011/0139720 A1* | 6/2011 | Soecknick | C02F 1/008 210/687 |
| 2012/0261346 A1 | 10/2012 | Soecknick | |
| 2013/0161256 A1* | 6/2013 | Henthorne | B01D 61/12 210/641 |

FOREIGN PATENT DOCUMENTS

| | | |
|---|---|---|
| CA | 2 734 777 A1 | 3/2010 |
| CA | 2 754 079 A1 | 9/2010 |
| CA | 2 782 923 A1 | 7/2011 |
| CN | 102666399 A | 9/2012 |
| DE | 10 2007 059058 B3 | 7/2009 |
| DE | 10 2009 055007 A1 | 6/2011 |
| DE | 10 2010 042541 A1 | 4/2012 |
| DE | 10 2011 003326 A1 | 8/2012 |
| EP | 2 196 885 A1 | 6/2010 |
| EP | 2481713 A1 | 8/2012 |
| JP | H02-053192 U | 4/1990 |
| JP | H05-261361 A | 10/1993 |
| JP | 2000 033250 A | 2/2000 |
| JP | 2003-019480 A | 1/2003 |
| JP | 2007/216173 A | 8/2007 |
| JP | 2011-505243 A | 2/2011 |
| JP | 2011-530395 A | 12/2011 |
| JP | 2012-501247 A | 1/2012 |
| JP | 2013-514166 A | 4/2013 |
| WO | 2011/092184 A1 | 8/2011 |
| WO | 2012/090699 A1 | 6/2014 |

OTHER PUBLICATIONS

Queens University, Module 1. Material Balances: Single Process Units without Reaction, CHEE 221: Chemical Processes and Systems, (http://my.chemeng.queensu.ca/courses/CHEE221/files/Module%201%20-%20non-reactive%20single-unit%20MBs.pdf) (Year: 2018).*

* cited by examiner

BLENDING CONTROL METHOD WITH DETERMINATION OF UNTREATED WATER HARDNESS VIA THE CONDUCTIVITY OF THE SOFT WATER AND BLENDED WATER

CROSS-REFERENCE TO RELATED APPLICATIONS

This continuation application claims priority to PCT/EP2013/076908 filed on Dec. 17, 2013 which has published as WO 2015/090366 A1, the entire contents of which are fully incorporated herein with these references.

DESCRIPTION

Field of the Invention

The invention relates to a method for operating a water softening plant comprising an automatic blending device, an incoming flow of untreated water $V_{untreated}$ being divided into a first partial flow $V_{part1}$ which is softened, and a second partial flow $V_{part2}$ which is not softened, and the two partial flows $V_{part1}$, $V_{part2}$ being combined into a flow of blended water $V_{blended}$, the proportions of the two partial flows $Prop_{part1}$, $Prop_{part2}$ in the flow of blended water $V_{blended}$ being adjusted by the automatic blending device such that a desired hardness DV results in the flow of blended water $V_{blended}$, the proportions to be adjusted of the two partial flows $Prop_{part1}$, $Prop_{part2}$ being calculated from the hardness of the untreated water $H_{untreated}$ and from the hardness of the softened water $H_{soft}$, and the hardness of the untreated water $H_{untreated}$ being derived from the conductivity of the untreated water $Cond_{untreated}$.

Background of the Invention

A method of this kind is known from DE 10 2009 055 007 A1.

Water softening is used wherever only relatively hard water is available via the usual supply systems (for example via the drinking water network), but a softer water is desirable for technical reasons or for reasons of convenience. In water softening, softening devices are used which usually operate according to the ion exchange method. In the process, the hardeners (calcium ions and magnesium ions) contained in the water are exchanged for sodium ions in an ion exchange resin. When the ion exchange resin is exhausted, it has to be regenerated, for example by flushing with brine.

It is often necessary or desirable, for technical or economic reasons, not to have available fully softened water, but water having a medium, but narrowly defined, water hardness. Fully softened water can lead to corrosion problems if the formation of a protective layer in the downstream pipeline installation is no longer possible. Furthermore, in full softening, the capacity of the softener is rapidly exhausted and said softener has to be regenerated at an early stage. This is associated with a high salt consumption and thus with high costs.

To carry out partial softening, a device (blending device) for mixing softened water (also known as pure water or soft water) and untreated water is required. It is usually desirable to adjust the water hardness in the blended water, i.e. the mixture of softened water and untreated water, to a predetermined desired value.

A direct determination of the hardness of blended water, by means of which a feedback control of the proportions of a partial flow carrying soft water and of a partial flow carrying untreated water could be set up, is basically possible using what is known as an ion-selective electrode in the blended water region. However, the ion-selective electrode is high-maintenance and susceptible to faults.

Therefore, in the prior art, the hardness of the blended water flow is usually adjusted in that a partial flow carrying untreated water having an at least approximately known untreated water hardness, and a partial flow carrying soft water also having an at least approximately known soft water hardness, are blended to form a flow of blended water in such proportions that the desired blended water hardness is obtained, cf. DE 10 2007 059 058 B3. In this document, in order to determine the hardness of the untreated water, the conductivity of the untreated water is determined using a conductivity sensor in the untreated water, and the untreated water conductivity is converted into the untreated water hardness using a calibration characteristic curve. A disadvantage of this approach is that the electrodes of the conductivity sensor can easily fur up in the untreated water, which makes the conductivity determination inaccurate and involves a high maintenance outlay.

To prevent the conductivity sensor furring up, DE 10 2009 055 007 A1 proposes arranging the sensor in the soft or blended water. According to this document, the conductivity of untreated water is, in a good approximation, about 95% of the conductivity of soft water obtained therefrom. Consequently, it is possible to directly infer the untreated water conductivity from the soft water conductivity. If the conductivity sensor is arranged in the blended water, the conversion factor changes according to the proportions of soft water and untreated water in the blended water. In turn, the untreated water hardness can then be determined using the untreated water conductivity.

Although this procedure prevents the conductivity sensor furring up, the method can only approximately determine the untreated water conductivity due to the assumption of a particular relationship between soft water conductivity and untreated water conductivity. If there are small fluctuations in the composition of the untreated water, the method can achieve a good blending accuracy in practice. However, greater fluctuations in the composition of the untreated water give rise to noticeable inaccuracies.

SUMMARY OF THE INVENTION

The object of the present invention is that of adjusting the hardness of the blended water in a very reliable manner and with improved accuracy during operation of an automatic blending device which mixes a flow of blended water consisting of a partial flow carrying soft water and a partial flow carrying untreated water.

This object is achieved by a method of the type mentioned at the outset which is characterized in that the conductivity of the softened water $Cond_{soft}$ is measured by a conductivity sensor in the softened first partial flow $V_{part1}$, and the conductivity of the blended water $Cond_{blended}$ is measured by a conductivity sensor in the blended water flow $V_{blended}$, the proportions of the partial flows $Prop_{part1}$, $Prop_{part2}$ in the flow of blended water $V_{blended}$ being determined, and in that the conductivity of the untreated water $Cond_{untreated}$ is calculated from the measured conductivity of the soft water $Cond_{soft}$, the measured conductivity of the blended water $Cond_{blended}$, and the determined proportions of the partial flows $Prop_{part1}$, $Prop_{part2}$.

Within the scope of the present invention, the conductivity of the untreated water can be not only estimated, but (within the measuring accuracy of the conductivity sensors used and optionally of flowmeters) can be precisely calculated. In particular, assumptions about the quality of the untreated water or the change in conductivity of the untreated water due to softening are not required.

Within the scope of the invention, two conductivity sensors are used, specifically one conductivity sensor in the soft water region in the first partial flow, after softening, and one conductivity sensor in the blended water region. In these positions, the conductivity sensors are exposed to virtually no noticeable water hardnesses, or any water hardnesses which are reduced compared with the untreated water, so that these conductivity sensors do not fur up, or at most only fur up very slowly. The conductivity of the blended water results from the conductivities in the soft water and in the untreated water and from the proportions of soft water and of untreated water in the blended water. According to the invention, two of the conductivities are measured directly, and the proportions of soft water (first partial flow) and of untreated water (second partial flow) in the blended water can be determined relatively easily, for example by means of two flowmeters. Then the only unknown factor in the interdependency of soft water conductivity, blended water conductivity and untreated water conductivity, i.e. the conductivity of the untreated water, can be easily calculated.

In this calculation, it is not necessary to make any assumptions about the composition of the untreated water. In particular, no assumption is required about the manner in which the conductivity of untreated water changes by softening, i.e. by the stoichiometric replacement of $Ca^{2+}$ and $Mg^{2+}$ ions by two $Na^+$ ions respectively. Such an assumption does not have to be made because corresponding but precise information is obtained by the second conductivity sensor.

The hardness of the untreated water can then be determined using the conductivity of the untreated water. A calibration characteristic curve or a calibration function is typically stored for this purpose in an electronic control device. Using the untreated water hardness and the soft water hardness, proportions can then be determined for the softened, first partial flow and for the second partial flow carrying untreated water, by means of which a predetermined desired hardness DV, which is usually stored in the electronic control device, is achieved in the blended water. These proportions are then automatically adjusted, for example by a feedback control comprising two flowmeters which directly or indirectly determine the two partial flows.

The information about the proportions of the partial flows $Prop_{part1}=V_{part1}/V_{blended}$ and $Prop_{part2}=V_{part2}/V_{blended}$ in the flow of blended water, where $Prop_{part1}+Prop_{part2}=1$, is identical to the information about a blend ratio $VVH=V_{part1}/V_{part2}$ in the flow of blended water, where $Prop_{part1}=VVH/(1+VVH)$ and $Prop_{part2}=1/(VVH+1)$.

The soft water hardness is typically 0° dH to 1° dH, depending on the type of softening device used (usually an ion exchange resin loaded with $Na^+$ ions) in the water softening plant. In most cases, a fixed soft water hardness which is typical of the softening device used is assumed, which hardness has been determined (and programmed in the electronic control device) for the water softening plant at the factory, for example, or which is simply assumed within a good approximation to 0° dH. However, it is also possible to determine the soft water hardness on the basis of an exhaustion degree of the softening device.

In a preferred variant of the method according to the invention, $Cond_{untreated}$ is calculated using the formula:

$$Cond_{untreated} = \frac{Cond_{blended} - Prop_{part1} \cdot Cond_{soft}}{Prop_{parts}}.$$

The untreated water conductivity $Cond_{untreated}$ can be easily calculated using this formula. In turn, it is noted that the proportions of the partial flows $Prop_{part1}$, $Prop_{part2}$ can also be expressed by the blend ratio VVH (see above) which, however, does not change the composition of the formula of this variant.

A variant is particularly preferred in which the proportions of the partial flows $Prop_{part1}$, $Prop_{part2}$ in the blended water $V_{blended}$ are determined by two flowmeters. As a result, a very exact determination and adjustment of the partial flows is possible, it being possible for the adjustment position of the automatic blending device, which adjusts the proportions, to be controlled in the feedback process. Two flowmeters can determine all three flows in the water softening plant (first partial flow, second partial flow, total flow of untreated water/blended water flow), if appropriate, by means of subtraction or summation.

An advantageous development of this variant provides that, in order to determine the proportions of the partial flows $Prop_{part1}$, $Prop_{part2}$, a first flowmeter is arranged in the first partial flow $Prop_{part1}$ and a second flowmeter is arranged in the blended water flow $V_{blended}$. Arranging the two flowmeters in the soft water and in the blended water makes it possible to prevent the flowmeters furring up. The proportions $Prop_{part1}$ and $Prop_{part2}$ can be determined from $V_{part1}$ and $V_{blended}$ via $V_{part1}+V_{part2}=V_{blended}$ and $Prop_{part1}=V_{part1}/V_{blended}$ and $Prop_{part2}=V_{part2}/V_{blended}$. $Cond_{untreated}$ is then calculated by $$Cond_{untreated} = \frac{V_{blended} \cdot Cond_{blended} - V_{part1} \cdot Cond_{soft}}{V_{part2}}.$$

Alternatively, for example one flowmeter can also be provided in each of the first partial flow and in the second partial flow respectively, or one flowmeter in the second partial flow and one flowmeter in the blended water flow, or one flowmeter in the incoming untreated water flow and one flowmeter in one of the partial flows.

In an advantageous variant of the method, the proportions of the partial flows $Prop_{part1}$, $Prop_{part2}$ are determined from an adjustment position of the automatic blending device, the automatic blending device in particular having a sensor for determining the adjustment position. The proportions which arise can also be determined without flowmeters from the known (namely specifically adjusted and/or sensorially checked) adjustment position of the automatic blending device, under flow conditions which are subject to the adjustment position but are known. This is particularly simple in terms of apparatus and is accordingly economical. The proportions of the partial flows for different adjustment positions can then be recorded in a table in the electronic control device, or they can be calculated by a programmed conversion function.

A variant of the method is particularly preferred in which the conductivity $Cond_{soft}$, measured by the conductivity sensor in the softened first partial flow $V_{part1}$, and the conductivity $Cond_{blended}$ measured by the conductivity sensor in the blended water flow $V_{blended}$, are averaged over an averaging period T or across a number N of single measurements, and the averaged values of $Cond_{soft}$ and $Cond_{blended}$ are used to calculate $Cond_{untreated}$. The conductivities of soft water and blended water are often only slightly different (in most cases by approximately 1 to 5%), meaning that even small measurement errors that are within the range of statistical noise can adversely affect the calculation of the conductivity of the untreated water. Averaging can make the calculation of the conductivity of the untreated water significantly more reliable.

A development of this variant is particularly preferred in which the proportions of the partial flows $Prop_{part1}$, $Prop_{part2}$ are not changed by the automatic blending device during the averaging period T or across the number N of single measurements. The averaging and a readjustment of the adjustment position of the blending device are then typically always carried out after an averaging period T or after the predetermined number N of single measurements of $Cond_{soft}$ and $Cond_{untreated}$. This variant can be carried out very easily and minimises the wear to the blending device.

An alternative development provides that the proportions of the two partial flows $Prop_{part1}$, $Prop_{part2}$ are also averaged over the averaging period T or across a number N of single determinations, and the averaged values of $Prop_{part1}$ and $Prop_{part2}$ are used to calculate $Cond_{untreated}$. In this variant, in particular "moving averages" of the values can be used for a continuous readjustment, i.e. the oldest measurement in each case in the set of values to be averaged is replaced by the most recent measurement just made. As a result, a particularly accurate determination of $Cond_{untreated}$ or a particularly accurate blending can be achieved.

According to a development, it is further preferred for the averaging time period T to be at least 2 minutes, preferably at least 10 minutes, or for the number N of single measurements or of single determinations to be at least 100, preferably at least 1000. These quantities have proved successful in practice and as a rule allow good compensation of statistical measurement errors made by the conductivity sensors. In particular, if conductivity measurements can be made in a very fast sequence (the duration of a single measurement being in the region of 10 ms or less), relatively short averaging time periods T in the region of 10 seconds or less, in particular 1 second or less, can also be considered.

Furthermore, a development is particularly preferred in which some of the values which fall within an averaging time period T or which belong to a number N of single measurements or single determinations are disregarded for the determination of the averaged value of $Cond_{soft}$ and/or $Cond_{untreated}$ and/or of the proportions of $Prop_{part1}$, $Prop_{part2}$. Consequently, the quality of the averaging can be improved. Untrustworthy and/or extreme values are ignored and thus do not falsify the averaged values.

In this case, it is advantageously provided that the disregarded values are outside a predetermined value interval, or that the disregarded values belong to a predetermined relative proportion of highest or lowest values in the averaging time period T or within the N single measurements or single determinations. This procedure has proved particularly successful in practice and provides averaged values which are not falsified by extreme measurement errors. For example, in general all conductivity single measurements in which the conductivity is not between 200 and 1500 µS/cm can be ignored as obvious measurement errors (i.e. they are not included in the averaging). Likewise, it is possible for example to ignore the highest 10% and the lowest 10% of the conductivity single measurements within the averaging period T or among the N considered conductivity single measurements.

In a particularly preferred variant of the method according to the invention, it is provided that, at regular intervals, preferably at least every 10 minutes, more preferably at least every 2 minutes, in an automatic manner:

the conductivity of the untreated water $Cond_{untreated}$ is recalculated from current values of $Cond_{soft}$, $Cond_{blended}$, $Prop_{part1}$ and $Prop_{part2}$, the hardness of the untreated water $H_{untreated}$ is derived again therefrom, the proportions, to be adjusted, of the partial flows $Prop_{part1}$, $Prop_{part2}$ are recalculated therefrom, and the adjustment position of the automatic blending device is readjusted accordingly.

As a result, it is possible to react promptly to possible changes in the quality of the untreated water and the blending accuracy can be kept at a high level. It is noted that, conversely, it is preferable to select the regular intervals to be at least 1 minute or longer in order to limit wear to the blending device.

A variant of the method is particularly advantageous in which the hardness of the softened first partial flow $H_{soft}$ is set at $H_{soft}=0°$ dH. This simplifies the calculation of the untreated water hardness and is sufficiently accurate in most use cases. A hardness slip can usually be disregarded when there is a regular, prompt regeneration of the softening device or ion exchanger used in the water softening plant and when the throughflow quantity through the softening device is not excessive.

A variant is also particularly preferred which provides that a hardness of the untreated water $H_{untreated}'$ which is used to control a regenerating procedure of a softening device of the water softening plant is derived from the calculated conductivity $Cond_{untreated}$ of the untreated water by a first calibration function K1, and that the hardness of the untreated water $H_{untreated}$ which is used to control the automatic blending device is derived from the calculated conductivity $Cond_{untreated}$ of the untreated water by a second calibration function K2. If $H_{untreated}'$ is higher than $H_{untreated}$ for relevant conductivities of the untreated water due to the different calibration characteristic curves K1 and K2, the regeneration control can be designed to be safe from hardness breakouts and at the same time the blending control can be designed realistically.

The scope of the present invention also includes a water softening plant comprising an automatic blending device, having a conductivity sensor in a soft water region and a conductivity sensor in a blended water region, designed to implement the above method according to the invention or one of the variants thereof. The water softening plant usually has an electronic control device which is programmed according to the provided method steps.

Further advantages of the invention will become apparent from the description and drawings. Likewise, the features which have been mentioned above and features which are described in the following can be used according to the invention in each case alone or together in any desired combinations. The embodiments which are shown and described are not to be understood as a final list, but rather they are of an exemplary nature for the description of the invention.

BRIEF DESCRIPTION OF THE DRAWINGS

The invention is illustrated in the drawings and will be described in more detail on the basis of embodiments. In the drawings.

DETAILED DESCRIPTION OF THE PREFERRED EMBODIMENTS

Figure 1:
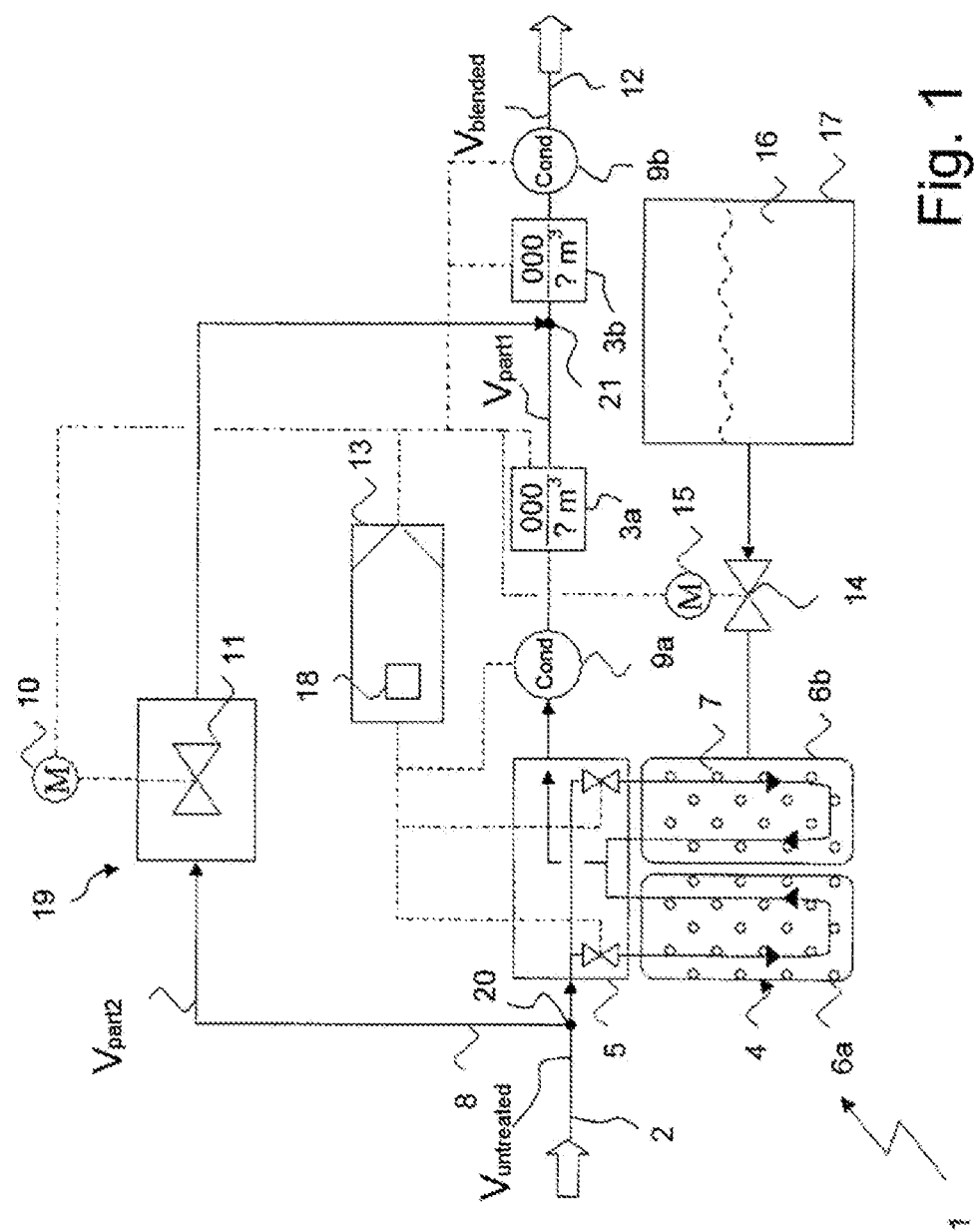
FIG. 1 shows the schematic construction of an embodiment of a water softening plant according to the invention, comprising two conductivity sensors and two flowmeters.

FIG. 1 shows, by way of example, a water softening plant 1 according to the invention for implementing the method according to the invention.

The water softening plant 1 is connected to a local water supply system, for example to the drinking water network, by an inlet 2. The entire flow of untreated water $V_{untreated}$ flowing in the inlet 2 is divided into two partial flows at a branch point 20.

A first partial flow $V_{part1}$ of the (entire) untreated water flow $V_{untreated}$ flows into a softening device 4 which has in particular a control head 5 and two tanks 6a, 6b containing ion exchange resin 7. A second partial flow $V_{part2}$ flows into a bypass line 8.

The untreated water of the first partial flow $V_{part1}$ flowing into the softening device 4 flows through at least one of the two tanks 6a, 6b containing ion exchange resin 7, the water being completely softened. In the process, the hardeners, i.e. calcium ions and magnesium ions, are stoichiometrically exchanged for sodium ions. The softened water then flows through a conductivity sensor 9a, which determines the conductivity $Cond_{soft}$ in the softened first partial flow $V_{part1}$, and through a flowmeter 3a.

The second partial flow $V_{part2}$ in the bypass line 8 passes through an automatically actuatable blending device 19, here comprising a blending valve 11 which can be adjusted by a servomotor 10.

The first partial flow $V_{part1}$ and the second partial flow $V_{part2}$ are finally combined at a combining point 21 to produce a blended water flow $V_{blended}$ which flows to an outlet 12. The outlet 12 is connected to a downstream water installation, for example to the freshwater pipes of a building. The blended water flow $V_{blended}$ is measured by a flowmeter 3b. Furthermore, the conductivity of the blended water $Cond_{blended}$ is measured by the conductivity sensor 9b.

The measurement results of the conductivity sensors 9a, 9b and of the flowmeters 3a, 3b are transmitted to an electronic control device 13. In turn, the electronic control device 13 can actuate the servomotor 10 of the blending valve 11 and can thereby adjust the second partial flow $V_{part2}$. The ratio of the second partial flow $V_{part2}$ to the first partial flow $V_{part1}$, the flow cross section of which is not variable here, can thus be changed. The electronic control device 13 can be considered as belonging to the automatic blending device 19.

A desired value DV for a blended water hardness is stored in the electronic control device 13. The following procedure is carried out in order to provide the desired water hardness $H_{blended}$ in the blended water at the outlet 12.

The control device 13 firstly reads out a current soft water conductivity $Cond_{soft}$ at the conductivity sensor 9a and a current blended water conductivity $Cond_{blended}$ at the conductivity sensor 9b. At the same time the current partial flow $V_{part1}$ is determined by flowmeter 3a and the current blended water flow $V_{blended}$ is determined.

The conductivity of the untreated water $Cond_{untreated}$ is then calculated using formula:

$$Cond_{untreated} = \frac{Cond_{blended} - Prop_{part1} \cdot Cond_{soft}}{Prop_{part2}}.$$

where $Prop_{part1} = V_{part1}/V_{blended}$ and $Prop_{part2} = V_{part2}/V_{blended}$. Using the correlation $V_{part1} + V_{part2} = V_{blended}$, the variable $V_{part2}$ can be eliminated, and the following formula results:

$$Cond_{untreated} = \frac{V_{blended} \cdot Cond_{blended} - V_{part1} \cdot Cond_{soft}}{V_{blended} - V_{part1}}.$$

This formula is stored in a memory 18 of the control device 13, as is all the other information required for the control functions of the water softening plant 1.

For example, if $Cond_{soft} = 660$ μS/cm, $Cond_{blended} = 645$ μS/cm, $V_{part1} = 5,000$ cm$^3$/min and $V_{blended} = 15,000$ cm$^3$/min, then $Cond_{untreated} = 638$ μS/cm.

The untreated water hardness can then be determined from this conductivity of the untreated water $Cond_{untreated}$. It is noted that in this situation, assuming that the untreated water conductivity is 95% of the soft water conductivity, then an untreated water conductivity of 627 μS/cm would be produced, which corresponds to a difference of almost 2%.

In the embodiment shown, the untreated water hardness is calculated twice in different ways by the control device 13 from the untreated water conductivity $Cond_{untreated}$. Firstly, an untreated water hardness $H_{untreated}'$ which is used for the regeneration control of the softening device 4 is determined using a first calibration characteristic curve K1. Here, the first calibration characteristic curve K1 is based on a conversion factor of 30 μS/cm per ° dH in this case, which is stored in the memory 18 of the control device 13. In the above example where $Cond_{untreated} = 638$ μS/cm, this thus produces an untreated water hardness $H_{untreated}'$ of 21.3° dH for the purpose of the regeneration control.

Secondly, using a second calibration characteristic curve K2, an untreated water hardness $H_{untreated}$ is determined which is used for the blending control. Here, the second calibration characteristic curve K2 is based on a conversion factor of 38 μS/° dH. When $Cond_{untreated} = 638$ μS/cm, an untreated water hardness $H_{untreated}$ of 16.8° dH for the purpose of the blending control is then produced.

Using the untreated water hardness $H_{untreated}$, the required proportions $Prop_{part1}$, $Prop_{part2}$ of the two partial flows $V_{part1}$, $V_{part2}$ in the blended water flow $V_{blended}$ can then be calculated by the control device 13 in order to achieve a particular desired value DV of the blended water hardness $H_{blended}$.

The correlation between the hardness in the soft water $H_{soft}$, the hardness in the untreated water $H_{untreated}$ and the hardness $H_{blended}$ in the blended water is:

$$H_{blended} = Prop_{part1} \cdot H_{soft} + Prop_{part2} \cdot H_{untreated}.$$

When $Prop_{part2} = 1 - Prop_{part1}$ and solved for $Prop_{part1}$, there results:

$$Prop_{part1} = \frac{H_{untreated} - H_{blended}}{H_{untreated} - H_{soft}}.$$

When $H_{blended}$=DV, a desired proportion $Prop_{part1}(DV)$ then results for the first partial flow $V_{part1}$, to which the blending valve can then be adjusted. If the current proportion $Prop_{part1}=V_{part1}/V_{blended}$ is less than $Prop_{part1}(DV)$, the soft water proportion is then increased during blending by adjusting the blending valve 11. If the current proportion $Prop_{part1}=V_{part1}/V_{blended}$ is greater than $Prop_{part1}(DV)$, the soft water proportion is then decreased by adjusting the blending valve.

$H_{soft}$ in the above formula can usually be assumed to be 0° dH in a good approximation, thereby further simplifying the calculation.

If, for example, when $H_{untreated}$=16.8° dH from the above example, the blended water hardness is to be adjusted to 5.0° dH, i.e. DV=5.0° dH, then at an assumed soft water hardness $H_{soft}$ of 0° dH, a desired proportion for the first partial flow is $Prop_{part1}(DV)$=0.70 or 70%. The electronic control device 13 then adjusts this proportion at the blending valve 11 by means of the servomotor 10.

The electronic control device 13 also monitors the state of exhaustion of the ion exchange resin 7 in the two tanks 6a, 6b. When water is removed, the removed quantity of soft water (cf. the first partial flow $V_{part1}$ and the water meter 3a) is in each case weighted with the associated current untreated current water hardness $H_{untreated}'$ calculated for the regeneration control, and is subtracted from the current residual capacity. If a tank 6a, 6b is exhausted, the electronic control device 13 takes the exhausted tank 6a, 6b from the network and subjects it to regeneration, and the other tank 6a, 6b can take over the provision of soft water for this time. For regeneration, a regeneration valve 14 comprising a servomotor 15 is automatically actuated by the electronic control device 13, as a result of which regenerating agent solution (preferably brine) 16 flows out of a storage vessel 17 through the exhausted tank 6a, 6b.

In a variant of the described method, it can be provided to resort to averaged values of $Cond_{soft}$ and $Cond_{blended}$ for the determination of the untreated water conductivity $Cond_{untreated}$. For this purpose, a relatively large number of single measurements, for example N=8, is typically carried out and the average is formed in each case, cf. the following Table 1 (values in μS/cm in each case):

TABLE 1

| | $N_i$ | | | | | | | | |
|---|---|---|---|---|---|---|---|---|---|
| | 1 | 2 | 3 | 4 | 5 | 6 | 7 | 8 | Average |
| $Cond_{soft}$ | 660 | 665 | 690 | 655 | 660 | 640 | 610 | 665 | 656 |
| $Cond_{blended}$ | 645 | 635 | 655 | 640 | 580 | 640 | 650 | 650 | 637 |

The averaging above all prevents pointless single readjustments, here for example for measurements no. 5 (where $Cond_{blended}$ is obviously too low) and no. 7 (where $Cond_{blended}$ was measured as being greater than $Cond_{soft}$ which is physically implausible). The adjustment position of the blending device 19 is readjusted here in each case, after (here) N=8 single measurements were made and the averaging was carried out using these single measurements, on the basis of the averages obtained. It is noted that the single measurements can be distributed evenly over the period of time between two readjustments, or they can also be bundled together, in particular all shortly before the end of the period of time between two readjustments.

It is also possible to discard single values of a group of values for the averaging, for example in the above example in each case the highest and lowest measured value from each group of N=8 single measurements, cf. Table 2 showing corresponding deletions (values again in μS/cm). As a result, the averaging quality can generally be further improved.

TABLE 2

| | $N_i$ | | | | | | | | |
|---|---|---|---|---|---|---|---|---|---|
| | 1 | 2 | 3 | 4 | 5 | 6 | 7 | 8 | Average |
| $Cond_{soft}$ | 660 | 665 | ~~690~~ | 655 | 660 | 640 | ~~610~~ | 665 | 658 |
| $Cond_{blended}$ | 645 | 635 | ~~655~~ | 640 | ~~580~~ | 640 | 650 | 650 | 643 |

Figure 2:
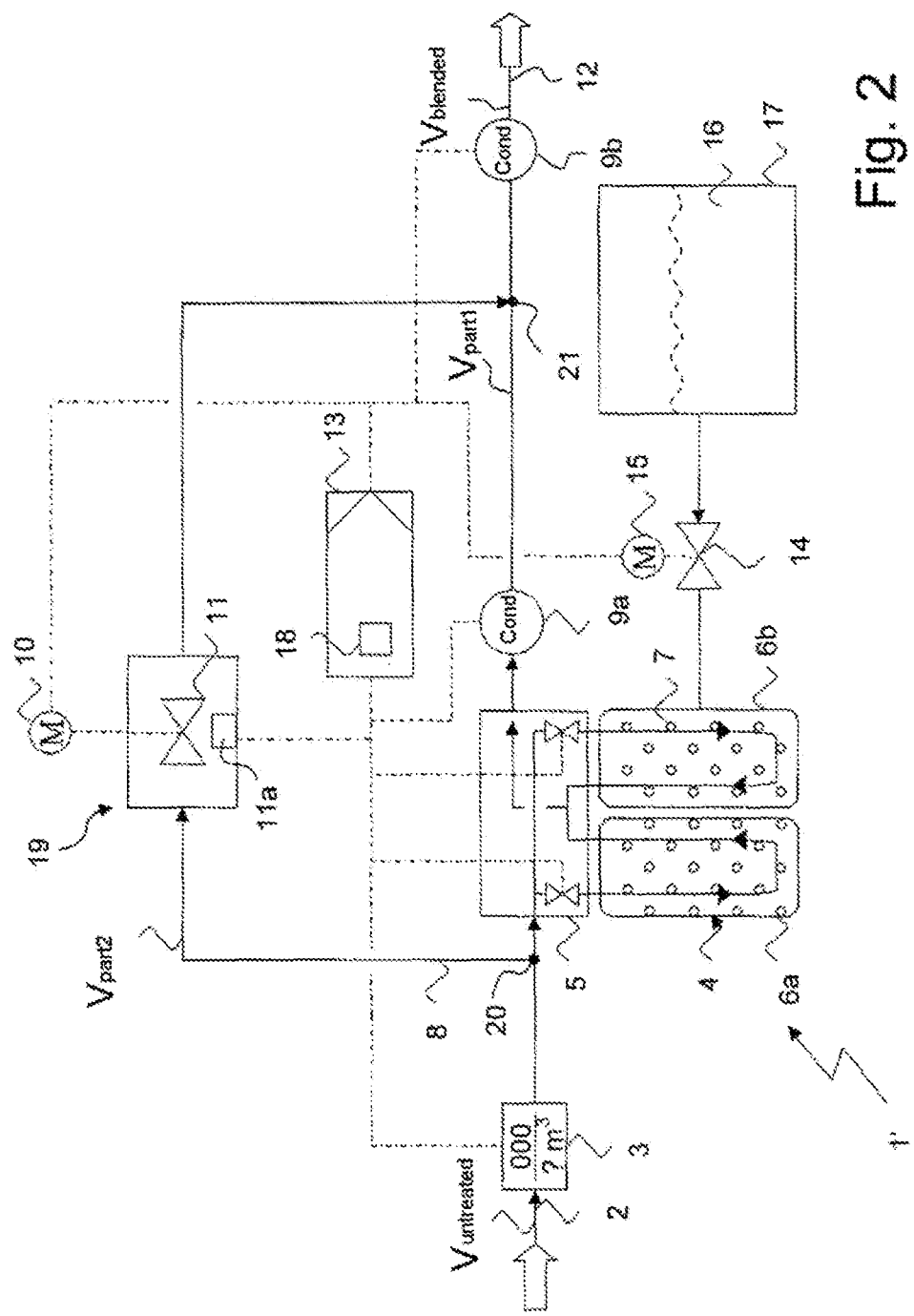
FIG. 2 shows the schematic construction of a further embodiment of a water softening plant according to the invention, comprising two conductivity sensors and one flowmeter as well as a sensor for determining the adjustment position of the automatic blending device.

FIG. 2 shows an alternative construction of a water softening plant 1' according to the invention. Only the essential differences compared with the previous construction are described.

In this water softening plant 1', there is only one flowmeter 3 in the still undivided inflowing untreated water flow $V_{untreated}$. Here, the blending valve 11 is provided with an additional sensor 11a, by means of which the adjustment position of the blending valve 11, measured here as the extended length of a locking pin, can be read out. For example the following Table 3 is stored in the control device 13 for this purpose:

TABLE 3

| Extended length | $Prop_{part1}$ | $Prop_{part2}$ |
|---|---|---|
| 0 mm | 0.25 | 0.75 |
| 1 mm | 0.30 | 0.70 |
| 2 mm | 0.40 | 0.60 |
| 3 mm | 0.55 | 0.45 |
| 4 mm | 0.75 | 0.25 |
| 5 mm | 1 | 0 |

Here, the locking pin can be extended by between 0 mm and 5 mm. When the locking pin is fully retracted (position 0 mm), the greatest possible second partial flow $V_{part2}$ of 75% is established at the blended water flow $V_{blended}$. The second partial flow $V_{part2}$ can be completely blocked by fully extending the locking pin (position 5 mm); in this case, soft water is provided at the outlet 12.

The division of the proportions $Prop_{part1}$, $Prop_{part2}$ can then be determined at any time from the position of the locking pin. Proportions $Prop_{part1}$, $Prop_{part2}$ in explicitly tabled positions can be read off directly from Table 3, and the proportions $Prop_{part1}$, $Prop_{part2}$ are determined by linear interpolation at positions of the locking pin between the indicated table points. Thus, for example, an extended length of 1.5 mm corresponds to a proportion $Prop_{part1}$ of 35%, or a proportion $Prop_{part1}$ of 60% corresponds to an extended length of 3.25 mm.

In this embodiment, a flowmeter is not required for the blending control. Using the flowmeter 3 (together with the current proportion $Prop_{part1}$ that accounts for the first partial flow $V_{part1}$ during a respective water removal and with the current untreated water hardness $H_{untreated}'$), only the absolute quantity of water which has been treated since the last regeneration of the softening device 4 is followed here in order to be able to promptly initiate the next regeneration.

Figure 3:
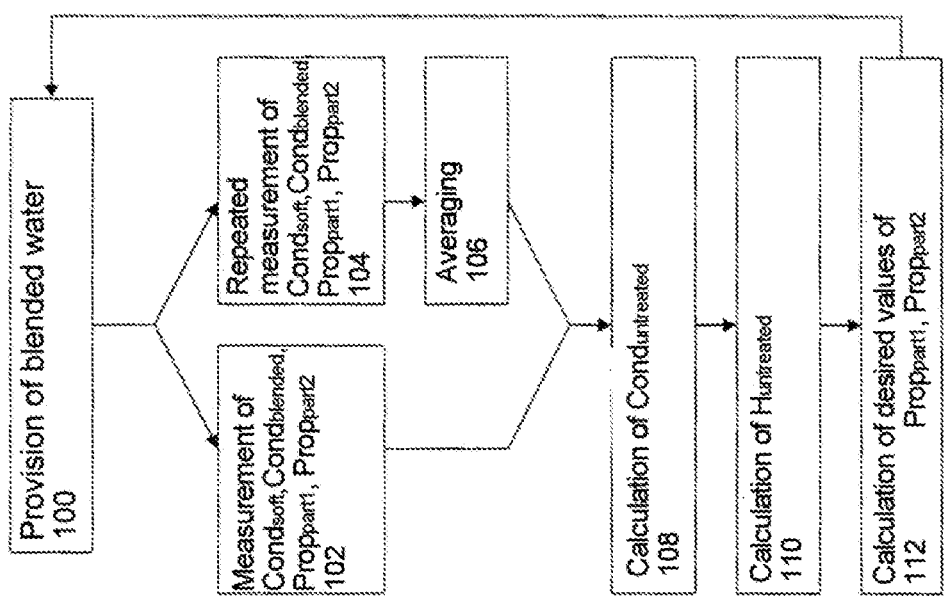
FIG. 3 is a schematic flow chart of the method according to the invention.

FIG. 3 is a flow chart of the method according to the invention, for example as implemented in the water softening plant of FIG. 1.

During normal operation, the water softening plant continuously provides blended water 100, the proportions $Prop_{part1}$ of softened water (first partial flow) and $Prop_{part2}$ of non-softened water (second partial flow) in the blended water, to which the automatic blending device is adjusted, being predetermined, for example by a previous calculation (see step 112) or by standard programming for the start of the method according to the invention. Using these proportions, a predetermined desired value DV is at least approximately obtained as the hardness of the blended water $H_{blended}$.

Typically, at the end of a particular period of time since the start of the method or since the last recalculation of the proportions $Prop_{part1}$, $Prop_{part2}$ (see step 112), for example after 10 minutes, the current soft water conductivity $Cond_{soft}$, the current blended water conductivity $Cond_{blended}$ and here also the current proportions $Prop_{part1}$, $Prop_{part2}$ are measured 102. Alternatively, a plurality of measurements of these values can also be made 104, in particular spread over the mentioned particular time period, and subsequently averaging 106 is carried out. It is noted that the proportions $Prop_{part1}$, $Prop_{part2}$ can also be determined without through-flow measurements, from the adjustment position of the automatic blending device.

Using these values or averaged values, while evaluating both $Cond_{soft}$ and $Cond_{blended}$ which were measured by sensors in the soft water region and in the blended water region, the current untreated water conductivity $Cond_{untreated}$ is calculated 108. The untreated water hardness $H_{untreated}$ is then determined 110 from this untreated water conductivity $Cond_{untreated}$ for the purposes of the blending control. In addition, an untreated water hardness $H_{untreated}'$ can now also be calculated for the purposes of the regeneration control.

Using the untreated water hardness $H_{untreated}$, the desired proportions of the partial flows in the blended water are re-determined 112 in order to obtain a blended water hardness $H_{blended}$ corresponding to the predetermined desired value DV. The provision of blended water 100 is then continued, the proportions $Prop_{part1}$, $Prop_{part2}$ of the partial flows now being adjusted to the desired values which have just been obtained. The measurements 102, 104 are repeated at the end of the mentioned particular time period, and so on.

What is claimed is:

1. A method for operating a water softening plant comprising the steps of:
providing the water softening plant comprising an automatic blending device, an incoming flow of untreated water $V_{untreated}$ being divided into a first partial flow $V_{part1}$ which is softened, and a second partial flow $V_{part2}$ which is not softened, and the two partial flows $V_{part1}$, $V_{part2}$ being combined into a flow of blended water $V_{blended}$;
adjusting by the automatic blending device the proportions of the two partial flows $Prop_{part1}$, $Prop_{part2}$ in the flow of blended water $V_{blended}$ such that a desired hardness results in the flow of blended water $V_{blended}$;
calculating the proportions to be adjusted of the two partial flows $Prop_{part1}$, $Prop_{part2}$ from a hardness of the untreated water $H_{untreated}$ and from a hardness of the softened water $H_{soft}$;
deriving the hardness of the untreated water $H_{untreated}$ from the conductivity of the untreated water $Cond_{untreated}$;
measuring the conductivity of the softened water $Cond_{soft}$ by a conductivity sensor in the first partial flow $V_{part1}$;
measuring the conductivity of the blended water $Cond_{blended}$ by a conductivity sensor in the flow of blended water $V_{blended}$;
determining the proportions of the partial flows $Prop_{part1}$, $Prop_{part2}$ in the flow of blended water $V_{blended}$; and
calculating the conductivity of the untreated water $Cond_{untreated}$ from the measured conductivity of the soft water $Cond_{soft}$, from the measured conductivity of the blended water $Cond_{blended}$ and from the determined proportions of the partial flows $Prop_{part1}$, $Prop_{part2}$.

2. The method according to claim 1, wherein the conductivity of the untreated water $Cond_{untreated}$ is calculated using the formula:

$$Cond_{untreated} = \frac{Cond_{blended} - Prop_{part1} \cdot Cond_{soft}}{Prop_{part2}}.$$

3. The method according to claim 2, wherein the proportions of the partial flows $Prop_{part1}$, $Prop_{part2}$ in the flow of blended water $V_{blended}$ are determined by two flowmeters.

4. The method according to claim 1, wherein in order to determine the proportions of the partial flows $Prop_{part1}$, $Prop_{part2}$, including a step of arranging a first flowmeter in the first partial flow $V_{part1}$ and arranging a second flowmeter in the flow of blended water $V_{blended}$.

5. The method according to claim 1, wherein the proportions of the partial flows $Prop_{part1}$, $Prop_{part2}$ are determined from an adjustment position of the automatic blending device, the automatic blending device comprising a sensor for determining the adjustment position.

6. The method according to claim 1, including the step of averaging over an averaging period T or across a number N of single measurements the conductivity $Cond_{soft}$ measured by the conductivity sensor in the first partial flow $V_{part1}$ and the conductivity $Cond_{blended}$ measured by the conductivity sensor in the flow of blended water $V_{blended}$, wherein the averaged values of $Cond_{soft}$ and $Cond_{blended}$ are used in calculating the conductivity of the untreated water $Cond_{untreated}$.

7. The method according to claim 6, wherein the proportions of the partial flows $Prop_{part1}$, $Prop_{part2}$ are not changed by the automatic blending device during the averaging period T or across the number N of single measurements.

8. The method according to claim 6, wherein the proportions of the two partial flows $Prop_{part1}$, $Prop_{part2}$ are also averaged over the averaging period T or across a number N of single determinations, and the averaged values of $Prop_{part1}$ and $Prop_{part2}$ are used to calculate $Cond_{untreated}$.

9. The method according to claim 6, wherein the step of averaging is over the averaging period T, wherein the averaging period T is at least 2 minutes.

10. The method according to claim 6, wherein the step of averaging is over the averaging period T, wherein the averaging period T is at least 10 minutes.

11. The method according to claim 6, wherein the step of averaging is across the number N of single measurements, wherein the number N of single measurements or of single determinations is at least 100.

12. The method according to claim 6, wherein the step of averaging is across the number N of single measurements, wherein the number N of single measurements or of single determinations is at least 1000.

13. The method according to claim 6, wherein some of the values which fall within the averaging period T or which belong to the number N of single measurements or a single determination are disregarded for the determination of the averaged value of $Cond_{soft}$ and/or $Cond_{blended}$ and/or of the proportions of $Prop_{part1}$, $Prop_{part2}$.

14. The method according to claim 13, wherein the disregarded values are outside a predetermined value interval, or in that the disregarded values belong to a predetermined relative proportion of highest or lowest values in the averaging period T or within the N single measurements or single determinations.

15. The method according to claim 1, wherein at regular intervals at least every 10 minutes in an automatic manner the conductivity of the untreated water $Cond_{untreated}$ is recalculated from current values of $Cond_{soft}$, $Cond_{blended}$, $Prop_{part1}$ and $Prop_{part2}$, the hardness of the untreated water $H_{untreated}$ is derived again therefrom, the proportions, to be adjusted, of the partial flows $Prop_{part1}$, $Prop_{part2}$ are recalculated therefrom, and an adjustment position of the automatic blending device is readjusted accordingly.

16. The method according to claim 15, wherein the regular intervals are at least every 2 minutes.

17. The method according to claim 1, wherein the hardness $H_{soft}$ of the first partial flow $V_{part1}$ is assumed to be $H_{soft}=0°$ dH.

18. The method according to claim 1, wherein a hardness of the untreated water $H_{untreated}$ which is used to control a regeneration procedure of a softening device of the water softening plant is derived from the calculated conductivity $Cond_{untreated}$ of the untreated water by a first calibration characteristic curve K1, and in that the hardness of the untreated water $H_{untreated}$ which is used to control the automatic blending device is derived from the calculated conductivity $Cond_{untreated}$ of the untreated water by a second calibration characteristic curve K2, wherein the first calibration characteristic curve K1 is based on a conversion factor of 30 µS/cm per ° dH, and wherein the second calibration characteristic curve K2 is based on a conversion factor of 38 µS/° dH.

19. The water softening plant comprising the automatic blending device, having the conductivity sensor in the soft water region and the conductivity sensor in the blended water region, designed to implement the method according to claim 1.

* * * * *

UNITED STATES PATENT AND TRADEMARK OFFICE
CERTIFICATE OF CORRECTION

PATENT NO. : 10,577,260 B2
APPLICATION NO. : 15/182988
DATED : March 3, 2020
INVENTOR(S) : Hartmut Dopslaff and Carsten H. Dopslaff Page 1 of 1

It is certified that error appears in the above-identified patent and that said Letters Patent is hereby corrected as shown below:

On the Title Page

Item (73), Assignee "JUDO WASSERAUFEREITUNG GMBH" should read --JUDO WASSERAUFBEREITUNG GMBH--.

Signed and Sealed this
Seventh Day of July, 2020

Andrei Iancu
*Director of the United States Patent and Trademark Office*